United States Patent [19]

Strick et al.

[11] Patent Number: 5,359,283
[45] Date of Patent: Oct. 25, 1994

[54] HAND HELD WAND FOR TRANSFERRING DATA FROM ONE DEVICE TO ANOTHER

[75] Inventors: Alan E. Strick, Hopedale, Mass.; John R. Widly, Orange, Calif.

[73] Assignee: Brooklyn Computer Systems Inc., Brooklyn, N.Y.

[21] Appl. No.: 39,577

[22] Filed: Mar. 29, 1993

[51] Int. Cl.⁵ ............................................. G01R 31/02
[52] U.S. Cl. .................... 324/72.5; 324/149; 324/754; 235/412
[58] Field of Search ............. 324/437, 445, 446, 690, 324/696, 715, 724, 72.5, 158 P, 149; 439/482; 235/441, 472

[56] References Cited

U.S. PATENT DOCUMENTS

| | | | |
|---|---|---|---|
| 2,946,002 | 7/1960 | Russell | 324/72.5 X |
| 4,121,574 | 10/1978 | Lester | 364/557 X |
| 4,672,306 | 6/1987 | Thong | 324/72.5 |

*Primary Examiner*—Gerard R. Strecker
*Assistant Examiner*—Diep Do

[57] ABSTRACT

A hand held wand utilizes an elongated rigid hollow longitudinally extending stainless steel tube open at both ends. A data collection probe is disposed in one tube end. A data uploading port is disposed in the other tube end. The probe and port each include a stainless steel body electrically and mechanically engaging the tube. Each body has a front surface disposed outside of the tube with a peripheral annular ring and a central recess extending inwardly and terminating in a rear surface having a first opening. Each body also includes a corresponding longitudinally extending central electrode disposed in the corresponding recess. Each central electrode has an exposed front surface flush with the ring and a rear surface aligned with and spaced from the opening. Electrical insulation is disposed in the recess to electrically isolate the electrode from the body and the tube. The two bodies and the tube define a common external electrical ground with respect to the central electrodes.

6 Claims, 2 Drawing Sheets

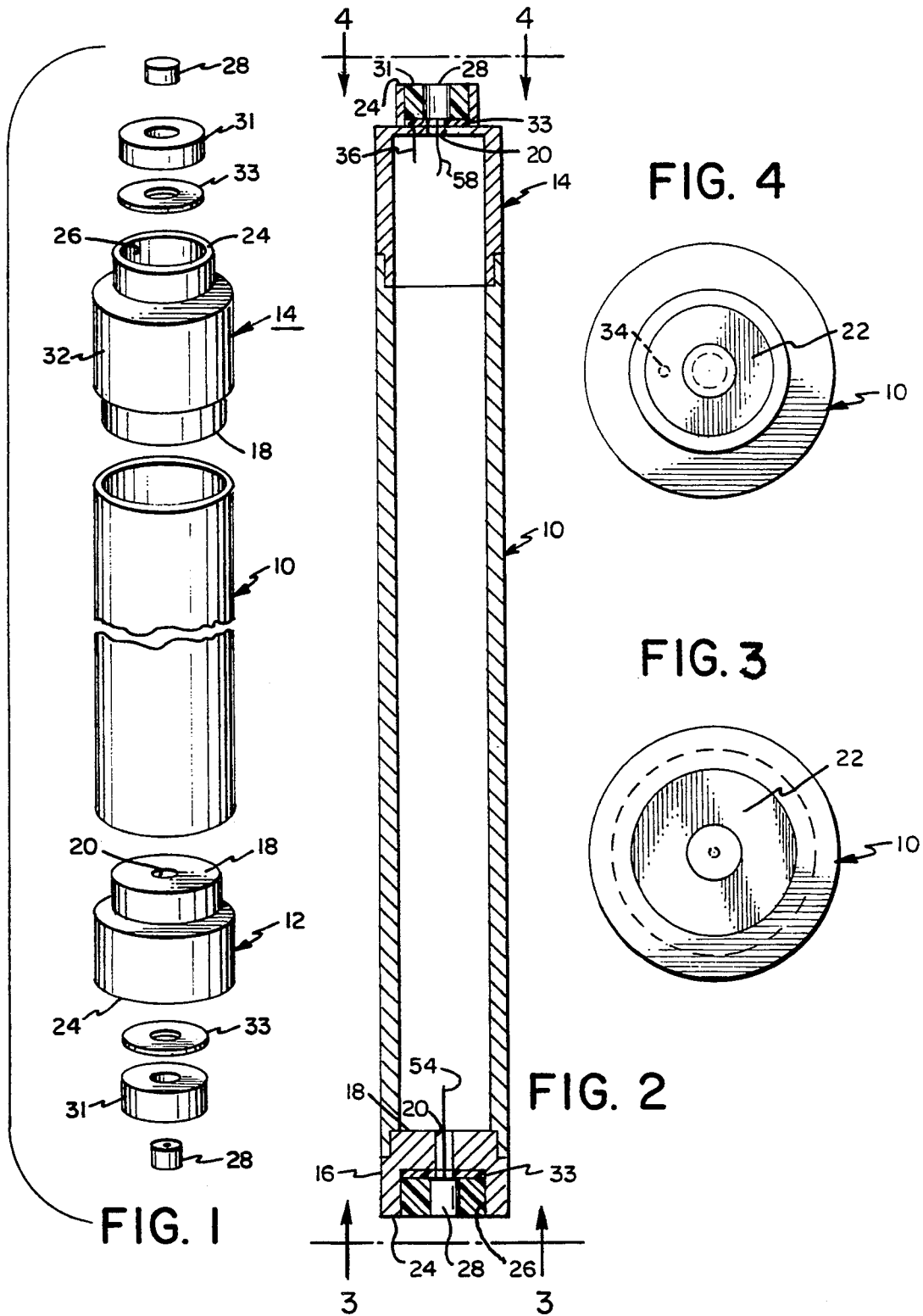

HAND HELD WAND FOR TRANSFERRING DATA FROM ONE DEVICE TO ANOTHER

BACKGROUND OF THE INVENTION

A known type of semiconductor memory chip is packed into a stainless steel can which can be disposed remotely in locations and on supports as desired. These chips have a single input-output electrode as well as a separate ground electrode connected to the can. Data can be read serially into or out of the chip by accessing the input-output and ground electrode.

A known type of hand held wand is used for collecting data from one or more of such can, then storing the collected data within the wand and, when desired, uploading the collected data to a computer or other separate device. This wand consists of an electrically non-conductive hollow tube having a probe at one end used for data collection and a port at the other end used for data uploading. The probe and port each have two electrodes, one of which is grounded. The tube contains suitable internal circuitry having ground electrodes connected in common to the ground electrodes of the probe and port.

The present invention is directed toward a new type of wand wherein the tube itself is electrically conductive and the probe and port have electrically conductive bodies making direct electrical and mechanical connections to the tube. The new type of wand is much more durable than the known wand. In addition, in contradistinction to the known wand, this new wand provides an external electrical shield, thus providing enhanced shielding protection for the internal circuitry.

SUMMARY OF THE INVENTION

Accordingly, it is an object of the present invention to provide a new and improved hand held wand that utilizes an electrically conductive tube with probe and port having electrically conductive bodies making direct electrical and mechanical connections to the tube.

Another object is to provide a new and improved wand of the character indicated wherein the tube provides external electrical shielding protection for circuity inside the tube.

Yet another object is to provide a new and improved wand wherein the probe and port have separate central electrodes and do not have separate ground electrodes.

These and other objects and advantages of this invention will either be explained or will become apparent hereinafter.

A hand held wand, in accordance with the invention, takes the form of an elongated rigid hollow electrically conductive longitudinally extending metal tube open at both ends. A data collection probe is disposed in one tube end. A data uploading port is disposed in the other tube end.

Each probe and port includes an electrically conductive metal body electrically and mechanically engaging the tube. Each body has a front surface disposed outside of the tube with a peripheral annular ring and a central recess extending inwardly from the front surface and terminating in a rear surface having a first opening.

Each body also is provided with a longitudinally extending central electrode disposed in the recess with an exposed front surface spaced from the ring and a rear surface aligned with and spaced from the opening. Electrical insulation is disposed in each recess of each body to electrically isolate the electrode from the body and the tube. The two bodies and the tube define a common external electrical ground with respect to the central electrodes.

The tube and probe and port bodies are formed from the same metal, typically stainless steel.

One of the bodies is provided with a second opening typically having a circular cross section whic is spaced from the first opening. An electrically conductive member typically having a non-circular cross section somewhat larger in area than the cross sectional area of the second opening is inserted in the second opening and extends into the interior of the tube.

The wand contains internal circuity having ground electrodes connected in common to the electrically conductive member. The tube with connected probe and port provides external electrical shielding for the internal circuitry.

BRIEF DESCRIPTION OF THE DRAWINGS

FIG. 1 is an exploded view of a preferred embodiment of the invention.

FIG. 2 is a longitudinal cross sectional view of the embodiment of FIG. 1 with the external circuity not shown.

FIG. 3 is a view taken along line 3—3 in FIG. 2.

FIG. 4 is a view taken along line 4—4 in FIG. 1.

DETAILED DESCRIPTION OF PREFERRED EMBODIMENT

Figure 5:
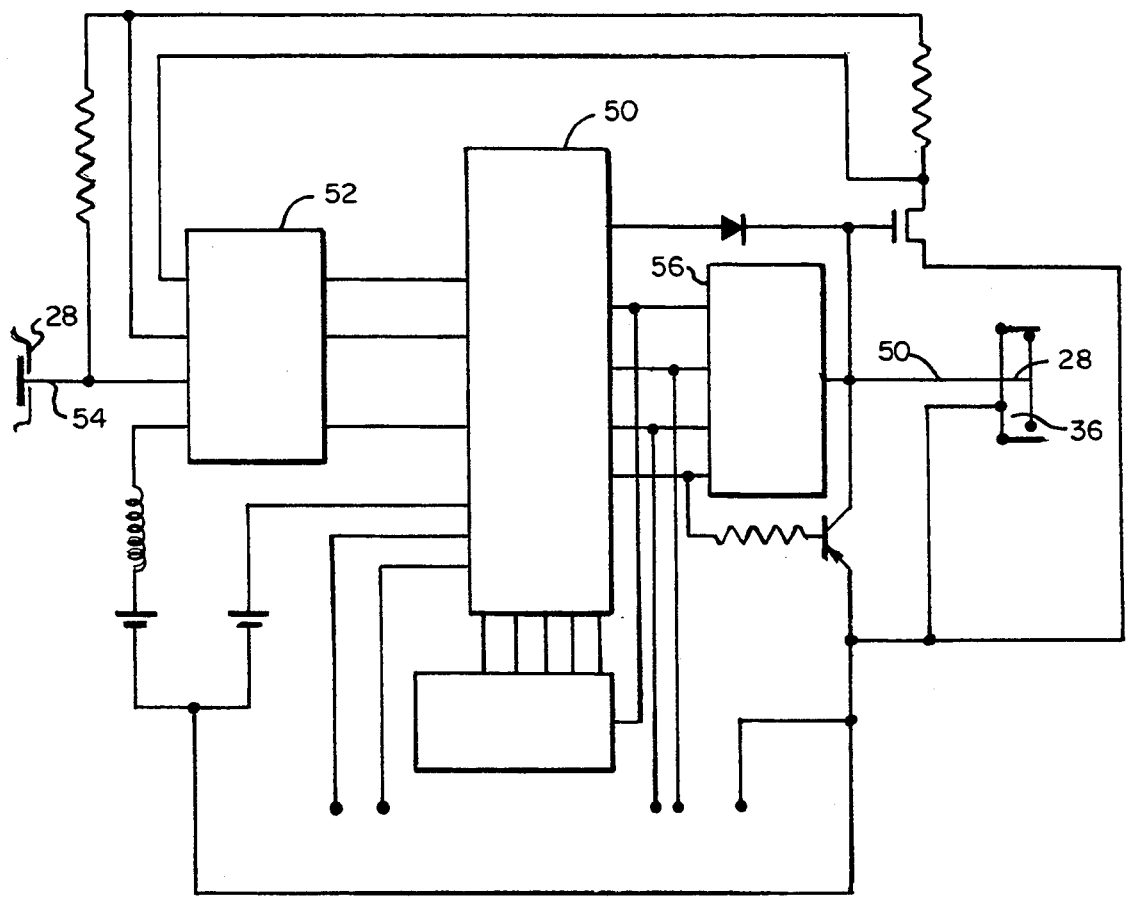
FIG. 5 is a block diagram of internal circuitry for the wand of FIG. 1.

Referring first to FIGS. 1–4, an elongated rigid hollow electrically conductive longitudinally extending tube 10 of stainless steel. The tube is open at both ends. A probe identified generally at 12 is disposed in one end of the tube. A port identified generally at 14 is disposed in the other end of the tube. As shown particularly in FIGS. 1 and 2, each end of the tube has a circular recess. The port and probe each have an end with a shoulder of reduced diameter that is fitted into the circular recess of the corresponding end of the tube to engage the port and probe mechanically with the tube. The tube, probe and port are all composed of electrically conductive stainless steel. Hence, the tube, port and probe are electrically engaged with each other.

The probe includes an electrically conductive body 16 of stainless steel electrically and mechanically engaging the tube. Body 16 has a front surface 22 with a peripheral annular ring 24 the body also has a central recess 26 extending inwardly from the front surface and terminating in a rear surface 18 having a central opening 20. A longitudinally extending central electrode 28 is disposed in the recess with an exposed front surface adjacent the ring and a rear surface aligned with and spaced from the opening. Electrical insulation 30 is disposed in the body recess to electrically isolate the electrode from the body and the tube. This insulation can include a non-conductive cylindrical bushing 31 with a central bore through which the electrode extends and a non-conductive washer 33 disposed between the rear surface of the electrode and the rear surface and having a central opening aligned with opening 20.

The port includes an electrically conductive body 32 of stainless steel electrically and mechanically engaging the tube. Body 32 is longer than body 16. Body 32 has a front surface 22 with a peripheral annular ring 24 the body also has a central recess 26 extending inwardly from the front surface and terminating in a rear surface 18 having a central opening 20. A longitudinally extending central electrode 28 is disposed in the recess with an exposed front surface adjacent the ring and a rear surface aligned with and spaced from the opening. Electrical insulation 30 is disposed in the body recess to electrically isolate the electrode from the body and the tube. This insulation can include a non-conductive cylindrical bushing 31 with a central bore through which the electrode extends and a non-conductive washer 33 disposed between the rear surface of the electrode and the rear surface and having a central opening aligned with opening 20.

The two bodies and the tube define a common external electrical ground with respect to the central electrodes. The outer diameter of the port is approximately equal to the diameter of the recess in the probe The body of the port is provided with a second opening 34 of circular cross section spaced from the first opening. An electrically conductive member 36, typically of aluminum or other metal softer than stainless steel has a non-circular cross section somewhat larger in area than the cross sectional area of the second opening is pressure fitted into the second opening and extends into the interior of the tube.

The wand contains internal circuity having ground electrodes connected in common to the electrically conductive member 36. The tube with connected probe and port provides external electrical shielding for the internal circuitry.

FIG. 5 is a block diagram of the internal circuitry. This circuitry is essentially identical with the circuitry used in the known wand, the only exception being the use in the present invention of ground electrodes being connected in common to member 36 instead of being connected in common to separate ground electrodes of probe and port as in the known wand.

Referring now to FIG. 5, a non-volatile SRAM microcontroller 50 is connected via a KickStarter chip 52 and a lead 54 insulatedly separated from the probe body and extending through opening 20 to be connected to the central electrode 28 of the probe. Similarly, microcontroller 50 is connected via an EconoRam time chip 56 powered by two internally disposed lithium cells B1 and B2 and a lead 58 insulatedly separated from the port body and extending through the central opening 20 to be connected to the central electrode 28 of the port. The micro-controller and the chips have ground electrodes connected in common to the electrically conductive member 36.

The wand is serialized by the time chip 56. When no data transfer takes place, the circuitry is in a low power resting state wherein only chips 52 and 56 are powered up. When the probe engages a remote memory chip, its central electrode engages the input-output electrode of the chip and its annular ring engages the stainless steel can. The circuitry is placed in a high power state and the data from the chip is serially entered and stored in the micro-controller. When the probe is disengaged, the circuitry returns to its low power resting state. Similarly, when the port is engaged with the input of a computer or the like, the circuitry is placed in the high power state and the data stored in the micro-controller is read out serially into the computer input. When the port is disengaged, the circuitry returns to its low power resting state.

While the invention has been described with particular reference to the drawings and to the preferred embodiment, the protection solicited is to be limited only by the terms of the claims which follow.

What is claimed is:

1. A hand held wand comprising:
an elongated rigid hollow electrically conductive longitudinally extending metal tube open at both ends;
a data collection probe disposed in one tube end;
a data uploading port disposed in the other tube end;
said probe and port each including an electrically conductive metal body of like metal to the tube and having one end electrically and mechanically engaging the corresponding tube end in which the corresponding one of the port and probe is disposed, each body having a front surface disposed outside of the tube with a peripheral annular ring and a central recess extending inwardly from the front surface and terminating in a rear surface having a first opening, each body further including a corresponding longitudinally extending central electrode disposed in the corresponding recess, each central electrode having an exposed front surface adjacent the ring and a rear surface aligned with and spaced from the opening, and electrical insulation disposed in the recess to electrically isolate the electrode from the body and the tube, the two bodies and the tube defining a common external electrical ground with respect to the central electrodes.

2. A hand held wand comprising:
an elongated rigid hollow electrically conductive longitudinally extending stainless steel tube open at both ends;
a data collection probe disposed in one tube end;
a data uploading port disposed in the other tube end;
said probe and port each including an electrically conductive stainless steel body having one end electrically and mechanically engaging the corresponding tube end in which the corresponding end of one of the port and probe is disposed, each body having a front surface disposed outside of the tube with a peripheral annular ring and a central recess extending inwardly from the front surface and terminating in a rear surface having a first opening, each body further including a corresponding longitudinally extending central electrode disposed in the corresponding recess, each central electrode having an exposed front surface adjacent the ring and a rear surface aligned with and spaced from the opening, and electrical insulation disposed in the recess to electrically isolate the electrode from the body and the tube, one of the bodies having a second opening in the rear surface spaced from the first opening, the two bodies and the tube defining a common external electrical ground with respect to the central electrodes.

3. The wand of claim 2 further including an electrically conductive member in the second opening and connected to the common ground.

4. The wand of claim 3 wherein the second opening has a circular cross section, said wand further including an electrically conductive member having a non-circular cross section somewhat larger in area than the cross sectional area of the second opening, said member being pressure fitted into the second opening and extending into the interior of the tube.

5. The wand of claim 4 wherein the outer diameter of the port is approximately equal to the diameter of the recess in the probe.

6. The wand of claim 5 wherein disposed inside the tube are: a non-volatile SRAM microcontroller connected via a KickStarter chip to the central electrode of the probe and connected via an EconoRam chip powered by an internally disposed lithium energy source to the central electrode of the port, said microcontroller and said chips having ground electrodes connected in common to said electrically conductive member the central electrodes of probe and port each being connected via a lead insulatedly separated from the corresponding body to the corresponding chip.

* * * * *